Figure 3:
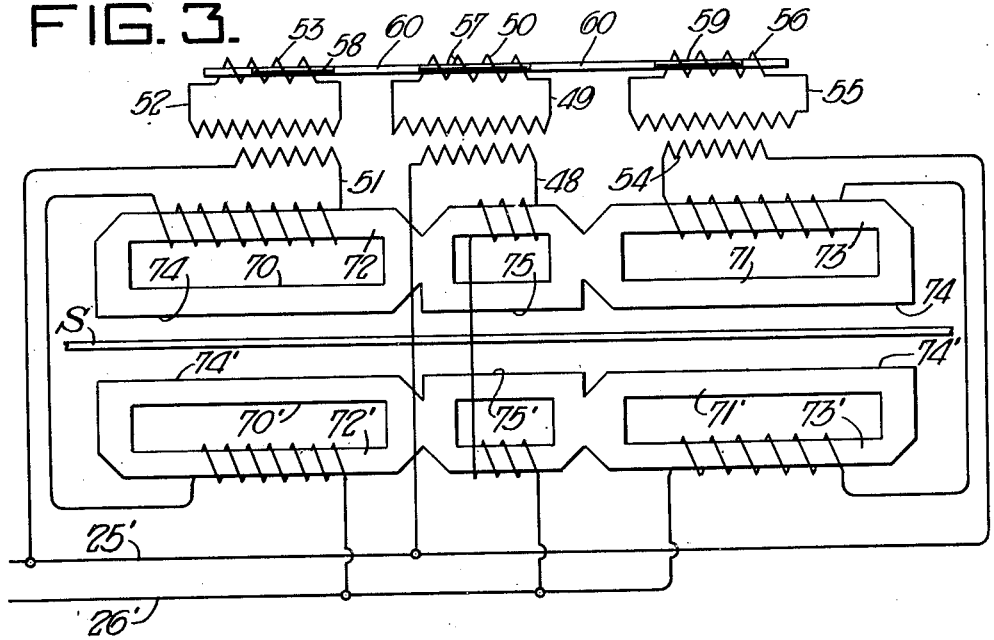

Oct. 26, 1943.  P. H. HUME  2,332,797
EXTENSOMETER
Filed Oct. 18, 1941  2 Sheets-Sheet 1
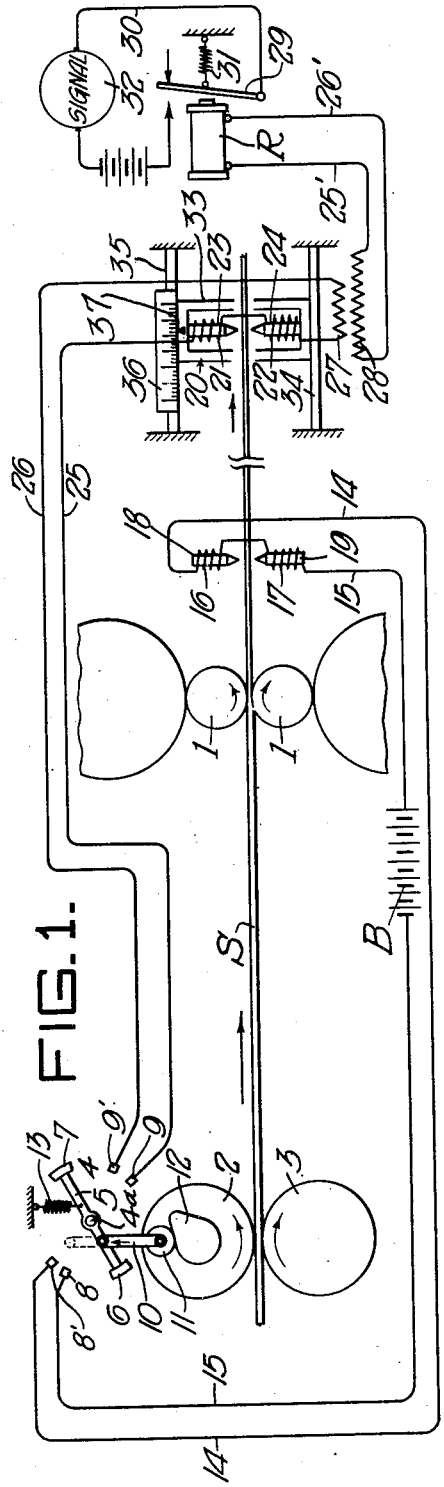
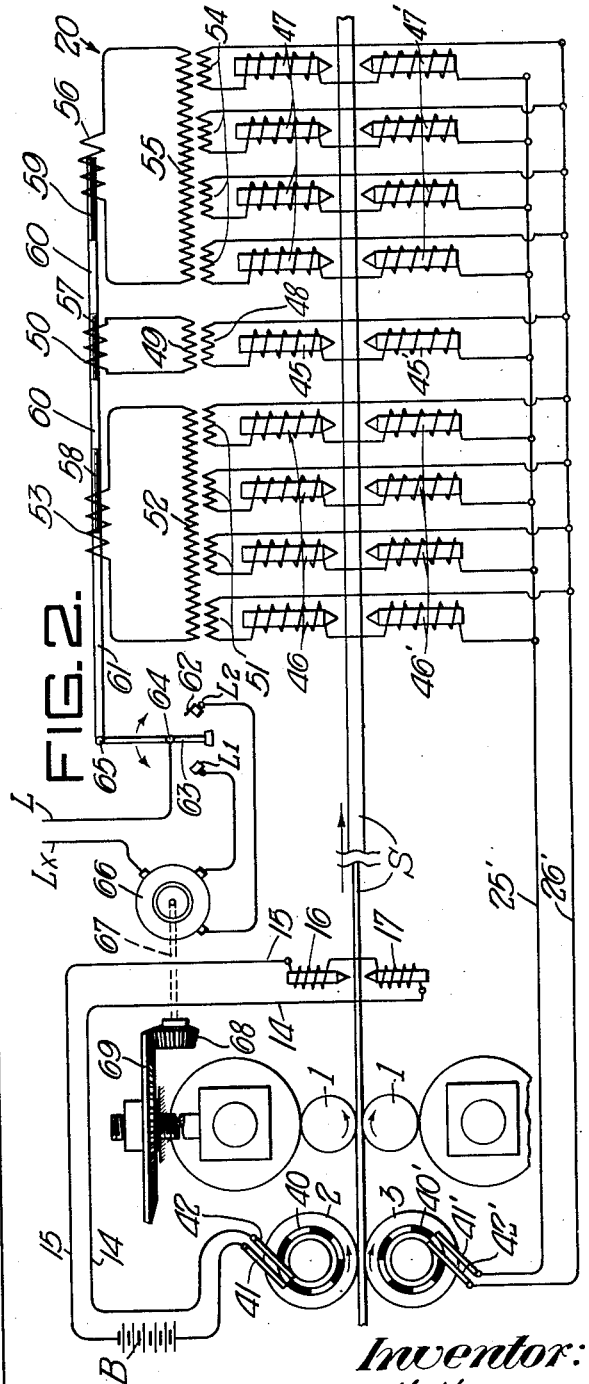
Inventor:
PATRICK H. HUME,
by John E. Jackson
his Attorney.

Oct. 26, 1943. P. H. HUME 2,332,797
EXTENSOMETER
Filed Oct. 18, 1941  2 Sheets-Sheet 2

Inventor:
PATRICK H. HUME,
by: John E. Jackson
his Attorney.

Patented Oct. 26, 1943

2,332,797

UNITED STATES PATENT OFFICE 2,332,797

EXTENSOMETER

Patrick H. Hume, Lakewood, Ohio, assignor to Carnegie-Illinois Steel Corporation, a corporation of New Jersey Application October 18, 1941, Serial No. 415,624

13 Claims. (Cl. 80—56)

This invention relates to a method and means for determining the amount of elongation imparted to magnetic material, such as steel strip and wire, being rolled or drawn. The invention contemplates the accomplishment of the measuring function while the work-piece is actually undergoing reduction, and further contemplates the accurate measurement of elongation imparted per unit length of work-piece, and/or the provision of means automatically to control the reducing instrumentalities, to provide for the continuous production of strip or wire uniformly of the desired gauge.

In its general purposes, the present invention has relation to the co-pending application filed in the names of A. E. Hibschman et al. on October 1, 1941, Serial No. 413,224, which is identified as a companion application, case A.

Specifically, the present invention differs from those disclosed in case A in that it gives effect to the purposes thereof without the need for the predisposition of a physical index marking upon the surface of the strip, and by the use, in lieu thereof, of a magnetic indexing applied, as hereinafter described.

As will be seen from the following description, the present invention treats more specifically with a novel magnetic measuring device by which any of the mill controls capable of altering the amount of reduction imparted to a work-piece, such as are disclosed in companion case A, can be actuated thereby.

The instant disclosure does not, therefore, repeat the disclosures of such mill control device effecting the decrease of compression and tension to which the work-piece is subject, since this relationship will become obvious after the ensuing description is read, in light of the disclosures made in the said pending application.

It is therefore, the primary object of the present invention to provide a method and means for measuring elongated metal bodies while they are undergoing reduction as by compression rolls or dies, without retarding or halting the reducing operation, and without physically marking or mutilating the work-piece in any manner.

It is a related object to correlate the measuring function either with signal devices, the actuation of which indicates when proper and improper rolling conditions are in progress so that manual correction thereof can be made, or with means automatically responsive to the condition of the work-piece being reduced to maintain the reducing instrumentalities adjusted to provide the gauge desired.

In the accompanying drawings, Figure 1 represents a schematic view taken in side elevation of a rolling mill, rolling strip to a thinner gauge in the direction of the arrows. It also includes circuit diagrams and physical appurtenances for giving effect to a simple embodiment of the invention.

Figure 2 is a view corresponding to Figure 1, schematically showing a rolling mill in the course of reducing strip with certain magneto-electrical instrumentalities for applying the invention to the automatic control of the screwdown mechanism of the rolling mill. To the right-hand side of this figure, the strip and apparatus have been enlarged more clearly to illustrate the principles of the invention.

Figure 4:
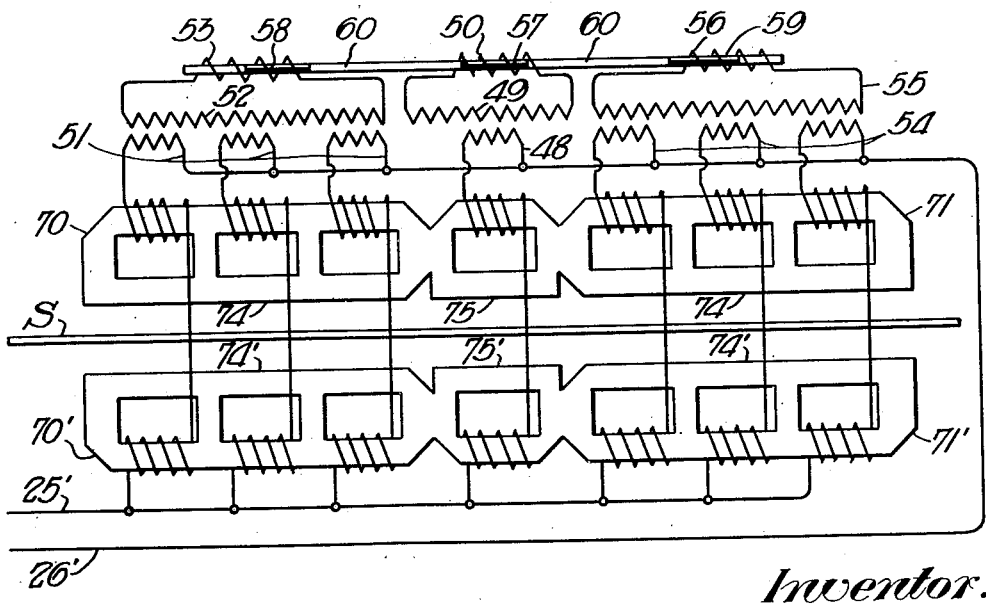

Figures 3 and 4 represent modifications of certain elements of the invention disclosed in Figure 2.

Referring now more particularly to the drawings, in Figure 1, the strip S is moved in the direction of the arrows, through reducing rolls 1, which impart a reduction in thickness, and an extension in length thereto.

At the approach side of the mill there are provided idle pinch rolls 2 and 3, which co-act firmly to grip the strip therebetween so as to be driven by the movement of the strip without slippage.

Suitably arranged upon a stationary support adjacent the pinch roll 2 in a switch mechanism 4, which comprises a switch arm 5 having contact bridging members 6 and 7, respectively, carried at its opposite ends. The switch arm is pivoted intermediate its ends, as at 4a, to the stationary support, so that it is free to oscillate to carry the contact elements 6 and 7 into engagement with contacts 8—8', 9—9', respectively.

Oscillatory motion is imparted to the switch arm 5 through a link or pitman 10, which is pivoted at one of its ends to the switch arm, and, at its other end, is provided with a cam roller 11 adapted to engage a cam 12. The cam 12 is disposed in relation to the pinch roll 2 so as to be driven thereby. The throw of the cam 12 is such as to move the switch arm from open circuit position to closed circuit position with respect to the contacts 8—8' and 9—9'. The return of the switch to open circuit position is assured by a tension spring 13, fixed to the switch arm at one of its ends, and secured to any suitable stationary support at its other end.

The switch 4, when moved to dispose the movable contact element across the contacts 8—8', closes a circuit comprised of leads 14 and 15, which carry direct current from any suitable source of supply, as has been represented by the battery B, to electro-magnets 16 and 17 disposed, respectively, upon opposite sides of the strip so that the north pole of one of the magnets, when energized, registers with the south pole of the magnet upon the opposite side of the strip. Each of the electro-magnets is provided with a core or stationary armature 18 and 19, respectively, the proximate extremities of which are tapered into a fine point spaced but slightly from the strip moving therebetween.

From the foregoing, it will be seen that as the switch 4 opens and closes the circuit 14 and 15, current from the battery B is induced to flow through this circuit to energize the electro-magnets 16 and 17 so as to set up a magnetic field of force through the strip and thus to establish a local magnetic field in the strip at those points along its length which happen by during the recurrent intervals when the switch 4 is in closed circuit position.

This magnetic trace is established in the strip at the exit side of the rolls from which it emerges in elongated condition. The frequency of the interval at which the local magnetic fields are established is determined by the rate of movement of the strip at the entry side of the reducing rolls translated into terms of rotary motion by the pinch roll 2. As illustrated, the switch 4 is opened and closed once every revolution of the pinch roll 2, and at linear distances along the length of strip entering the mill equal to the circumferential extent of the pinch roll 2. The time interval of establishing the marks is governed by the speed of travel of the entering strip, while the distance between marks increases as the elongation thereof.

If the mill is not reducing the strip, the spots of magnetism placed thereon by the electro-magnets 16 and 17 would be spaced apart from center to center, a distance equal to the circumference of the pinch roll 2. This distance can be measured in accordance with the present invention by disposing a take-off mechanism 20 the necessary distance upon the down-stream side of the magnetic index establishing electro-magnets 16 and 17. This take-off mechanism may be the counterpart of the latter by presenting electro-magnets 21 and 22 upon opposite sides of the strip having pointed core pieces 23 and 24 disposed upon opposite sides of the strip in line with the magnetic markings, so that the passage of the latter will establish temporary magnetization of the core-pieces so as to induce a current in the lines 25 and 26, which, at one end, terminate in the contacts 9—9' of the switch 4, and, at the other end, terminate in the primary winding of an induction coil or transformer 27.

Any current induced in the primary winding 27 is similarly induced in the secondary winding 28, which is in such relation to the primary as to step-up the voltage thereof, and to pass such current through leads 25'—26' to a relay R. The relay has an armature 29 to one end of which is connected the lead 30 of a signal circuit, the other end of which being adapted to close such circuit against the tension of the spring 31 upon energization of the relay R, whereby current from any suitable source, such as is here represented by the battery B, may be permitted to flow and actuate a signal device 32, which may be in any suitable form.

In the foregoing description, it will be seen that, for the take-off circuit 25—26 to be energized by the magnetic markings established by the electro-magnets 16 and 17, two conditions must obtain: First, there must be a magnetic mark disposed between the points 23—24 of the electro-magnets 21 and 22, and, secondly, the switch 4 must be in closed position so as to cause the contact 7 to bridge the circuit contacts 9—9' to complete the circuit of the latter. Thus, it will be seen that unless the apprehension of the magnetic mark by the electro-magnets 21—22 coincides with the closing of the circuit by the switch 4, no current will be induced in the take-off circuit 25—26. This means further that the possible energization of this take-off circuit is synchronized with the establishment of the magnetic markings by the electro-magnets 16 and 17, since the cam 12 actuates the switch arm 5 to close the magnetic mark establishing circuit, and the magnetic mark take-off circuit, coincidentally.

The take-off mechanism 20 is carried by a sliding frame 33 which is supported by stationary slide bearings 34 and 35, one of which stationary slide bearings, illustrated to be 35, carries a fixed scale 36 on which, by reference to a fixed index point 37 on the movable frame 33, units of elongation are readable. Let it be assumed that the work rolls 1 of the rolling mill are not subjecting the strip S to any reduction, then if the take-off mechanism 20 is spaced from the magnetic establishing magnets 16 and 17 a distance corresponding to the circumferential extent of the pinch roll 2, or multiple thereof, the take-off mechanism will receive a magnetic impulse from a previously established magnetic mark simultaneously with the establishment of a succeeding mark by the electro-magnets 16 and 17.

Since, at the instant a magnetic marking is being established by the closing of the contacts 8—8' by the contact element 6, the circuit 25'—26' is closed by the contact element 7 bridging the contacts 9—9', a current is induced in the primary winding 27, which, in turn, induces a current in the secondary winding 28 to cause actuation of the relay R to close the associated signal circuit 30.

Let it now be assumed that the work rolls 1 impart some reduction to the strip to extend it, a greater amount of strip per unit of time passes the electro-magnets 16 and 17 than is required for the strip at the entering side of the mill to turn the pinch roll 2 one revolution. This means that for the take-off circuit 25—26 to be energized by a magnetic mark simultaneously with the establishment of such a mark by the magnets 16 and 17, the take-up mechanism must be moved farther away from the latter an amount corresponding to the extension imparted per unit length of strip by the work rolls 1. The extent of this movement is readable upon the fixed scale 36 by reference to the line 37 on the movable frame to give the actual amount of elongation being imparted to the strip.

It will be understood that the simultaneous establishment and reception of magnetic marks, as is provided by the coordinating timing of the switch 4, is announced by the recurrence of the actuation of the signal 32, the failure of which to act indicates that the mill has, for various reasons, failed to impart the required elongation.

When this off-gauge condition becomes apparent, the take-off mechanism 20 may be slid backward and forward along the slide bearings 34—35 until the signal again resumes operation, at which point on the fixed scale 36, the operator can determine the direction and extent of departure from gauge. Then, by resetting the slideable frame 33 of the take-off mechanism to the desired setting, the operator may adjust the mill accordingly until restitution of the proper gauge is announced by the signal.

In the embodiment shown in Figure 2, magnetic index establishing magnets 16 and 17 are provided to lay down a magnetic trace in the strip S, as previously explained in connection with Figure 1. In this case, the pinch rolls 2 and 3 have been provided with synchronized current commutators 40—40', instead of the double throw switch 4 described in connection with Figure 1. In the case of the pinch roll 2, brushes 41 and 42 are arranged recurrently to energize the index-establishing magnets 16 and 17 through the circuit 14—15, of which the battery B, or any other other suitable source of current, is a part.

The take-off mechanism 20, instead of being an individual magnetically responsive device, as previously described, comprises a gang of movably mounted devices, constructionally and functionally similar to the one described in Figure 1. In this case, however, the receiving magnets are arranged in three groups: A center unit comprised of magnets 45—45', and a gang grouping to each side of such center unit; those to the left, as viewed in Figure 2, being represented by reference numerals 46—46', those to the right being represented by reference numerals 47—47'.

The center magnets 45—45' are arranged in circuit with a primary winding of an induction coil or transformer 48, the circuit of which is opened and closed through bus bars 25'—26' by the commutator 40' associated with the pinch roll 3. The primary winding 48 is associated with a secondary winding 49, which is provided with a sufficient number of turns to step up the primary voltage for the energization of a solenoid coil 50.

Each of the magnets 46—46' is provided with primary windings 51 which cooperate with a common secondary winding 52 of an induction coil or transformer, the leads of which secondary are applied to a solenoid coil 53. The circuit of each of the magnets 46—46' is opened and closed through the bus bars 25'—26' by the commutator 40' as in the case of the previously described central magnetic circuit.

The magnets 47—47' are similarly provided with primary circuits, which are commutated through the bus bars 25'—26' by the commutator 40, through which the secondary windings 54 of each are energized. A secondary winding 55 is associated with the primary windings 54, in the circuit of which secondary is included a solenoid coil 56.

Each of the solenoid coils 50, 53, and 56, is provided with an armature 57, 58, and 59, respectively, which are connected together for unitary movement by non-magnetic portions 60. Suitably connected to the armature assembly, as by a non-magnetic extension 61, is a switch 62, which comprises an oscillatory arm 63 pivoted intermediate its ends, as at 64, for movement between contacts $L_1$ and $L_2$ to which it is adapted alternately to connect one side of an electrical circuit represented by the lead L. The switch arm 63 is moved in response to movement of the armature assembly by being connected to the extension 61 thereof as at 65.

A reversing motor 66 is provided to receive energizing current from the leads $L_x$ and L, the latter of which is connected through either the lead $L_1$ or the lead $L_2$ to drive the motor in clockwise or counter-clockwise direction, as the case may be. The drive shaft of the motor is shown schematically as being connected, as at 67, to drive a bevel pinion 68, which, in turn, is adapted to drive a bevel gear 69 of the screwdown mechanism of the mill of which the work rolls 1 are a part.

The leads $L_1$ and $L_2$ may, instead of actuating the screwdown mechanism of the mill as shown, be directed to control either the pay-off reel generator, or the take-up reel motor, to vary the tension in the strip being reduced in a manner, and for the reasons, set forth in the companion application hereto, case A, previously mentioned. In this manner, its applicability to a tension wire drawing operation through a die is apparent. As in case A, both the compression and tension corrections may be simultaneously applied when rolling strip, or its equivalent.

The operation of the device is as follows: As the strip is moved in the direction of the arrows through the reducing rolls 1, the magnetic index is established therein by the magnets 16 and 17 at a rate determined by the speed of the strip at the entering side of the mill, by which, through the pinch roll 2, the electrical current circuit 14—15 is commutated.

The pick-up mechanism 20 will have been predisposed at a suitable distance (corresponding to gauge extension, as explained in Figure 1) from the establishing magnets 16 and 17 in such manner that, when the commutator 40 is in closed circuit position relative to the magnets 16 and 17, and the commutator 40' is in closed circuit position relative to the pick-up magnets 20, a predisposed index mark will be between the points of the center magnets 45—45'. When this is done, the material is on-gauge, and a current will be induced in the primary circuit 48 in the secondary circuit 49 in the center magnets so as to energize the coil 50 to position the armature 57 entirely within the coil, where it reduces the magnetic reluctance of the magnetic circuit thereof to a minimum. In this center position, by means of the non-magnetic connections 60 and 61, the adjacent armatures 58 and 59 would be disposed toward the center coil approximately one-half way within their respective coils 53 and 56, and the switch arm 63 would be poised midway between the lead contacts $L_1$ and $L_2$. In this condition, the circuit to the motor 66 is accordingly open, and no screwdown operation is effected.

Let it be assumed that the strip being rolled is subjected to insufficient reduction, then its elongation is accordingly shortened, so that, when the commutators 40—40' establish an index mark and close the circuits of the take-off mechanism 20, a preceding magnetic index mark will not fall beneath the center magnets 45 and 45' of the take-off mechanism, but will be somewhere within the range of the take-off magnets 46—46'. Therefore, during the interval at which the commutator 40' maintains the take-off circuits closed, the magnetic index mark magnetizes a pair of the magnets 46—46' inducing a current to flow momentarily in the primary windings 51 of the associated circuit. This, in turn, induces a current in the secondary 52, energizes the solenoid coil 53 so as to attract its armature 58, and draws the armature, and its associated assembly, leftwardly. This moves the switch arm 63 to connect the lead L with the lead $L_2$ to drive the motor 66 in a direction so as to increase the screwdown pressure exerted by the work rolls 1 upon the strip. The strip will thus be alongated a greater amount.

The correction will continue to be applied until the closing of the take-up circuits by the commutator 40' is effected simultaneously with the presence of a magnetic index mark within the effective range of the center magnets 45—45'. When this happens, the proper gauge condition has been restored, and is thereafter preserved by the ensuing energization of the coil 50, through the primary 48 and secondary windings 49 of the center magnets, which causes the armature 50 to return from its leftwardly displaced position of the assumed example, to the center of the coil, as previously mentioned. When this is done, the switch arm 63 is returned to open position, midway between the contacts L₁ and L₂.

If the strip were being given too much extension, a similar operation would be effected through the magnets 47—47′, the primary and secondary circuits 54 and 55 thereof, respectively, and the coil 56. In this case, the armature 58 would be drawn rightwardly, as shown in Figure 2, into the coil 56, so as to reduce to a minimum the reluctance of the magnetic circuit of that coil, simultaneously withdrawing the armature 57 rightwardly to a position about half way out of the coil 50, and the armature 54 almost entirely out of its associated coil 53, in the same direction. This would cause the switch arm 63 to connect the lead L with the lead L₁ so as to energize the motor to operate in a direction opposite to that previously described, thus to effect a relieving of the compressive force of the rolls 1. The correction is continued until a magnetic mark lies within effective distance of the center magnets 45—45′, which causes the coil 50 to be energized so as to return the armature assembly and switch arm 63 to neutral position, as previously described. As shown in the aforementioned companion application, case A, the screwdown pressure may be substituted or replaced by a correction imposed by varying the tension to which the strip is being subjected, in which case, the leads L₁ and L₂ would be in a relay circuit capable of varying the field resistance of either the take-up reel motor or the pay-off reel generator, all as set forth in that application.

In Figures 3 and 4, there are shown simplified embodiments of the device of Figure 2. In Figure 3, the magnets 46—46′ and magnets 47—47′ are brought together so as to provide two magnets 70—71, respectively, each having an annular core 72 and 73, respectively, designed to present an elongated pole 74 parallel to the surface of the strip and closely adjacent thereto. The pole faces 74 extend over an area of strip in a longitudinal direction substantially commensurate with the gang of magnets illustrated at 20 in Figure 2. The central magnet has an abbreviated pole face 75, and is arranged in contiguous relation to magnets 70 and 71. The magnet 70 is provided with a primary circuit 51, a secondary circuit 52, and a solenoid coil 53, the same as described in the case of Figure 2. The center magnet 75, and the right-hand magnet 71, all similarly provided with primary and secondary circuits, the same as disclosed in Figure 2, by virtue of which the same reference numerals have been applied. The armature arrangement, the motor control switch 62, and associated parts, being as they are similar to those disclosed in Figure 2, have been marked accordingly, as will not be redescribed.

When an index mark passes beneath the pole face 74 of either of the magnets 70 or 71, a current is induced in the associated primary and secondary circuits as previously described so as to cause a compression or tension correction of the strip to be instituted accordingly.

Figure 4 illustrates another arrangement which effects somewhat of a compromise between the take-off devices of Figures 2 and 3. As in Figure 2, several magnet windings are provided to serve individual primary windings, but as in Figure 3, more or less unitary pole faces are presented to the strip. Since the same reference numerals have been applied to Figure 4 to signify parts corresponding to those disclosed in the other figures, no further description of the Figure 4 modification is deemed necessary.

Accuracy of operation requires that the commutation of the index establishing current, which also determines the rate of take-off, be no more than will provide for the passage of but one index mark at a time within the longitudinal limits of the assembly of take-off magnets shown in Figures 2, 3 and 4. Thus, no matter where the mark may fall when the take-off circuits are closed, the correction must be such as to return the ensuing magnetic marks toward the central magnets, there to bring to a halt the correcting function.

The distance at which the magnets, disclosed in Figure 2, should be spaced apart longitudinally of the strip is determined by with what degree of criticalness it is desired to control the gauge of the strip being produced. If the commutation of current at the entry side of the mill is such as to establish a magnetic index mark every one foot of strip, as unreduced, and the points of the magnets 45, 46 and 47, and their respective primes, are spaced a quarter of an inch (¼″) apart, the reduction in area will be controlled to within 1% of the gauge setting. Thus, by way of example, it could be assumed that strip of .010″ gauge is being rolled, and is being indexed so as to place the localized magnetic marks one foot apart, the ¼″ variation in extension (which is 2% of the unit length) equals approximately 1% reduction in area, as mentioned, or, for this size stock, would amount to one-ten thousandths of an inch (.0001″) reduction in thickness. This is a working tolerance far more critical than that obtainable from any of the devices now being used commercially for similar purposes.

If it is desired to control percentages of extension less than 1%, it is but necessary to enlarge the circumferential extent of the pinch roll 2, or otherwise to decrease the commutation rate thereof, while maintaining the spacing between the take-off magnets substantially constant. This will have the effect of disposing a greater linear extent of strip between the magnetic index marks, in relation to which the ¼″ spacing of the take-off magnets will be relatively diminished, thus creating a "vernier effect" for the more critical determination of increments or decrements of elongation per unit length of strip.

It will be understood that the take-off magnets will be predisposed in relation to the index establishing magnets so that, when the strip is undergoing no reduction, the central magnet will fall that distance from the index establishing magnets equal to one complete commutating cycle, or multiple thereof, of the commutator 40, as determined by the degrees of revolution of pinch rolls 2 and 3 revolving without slippage upon the strip as it approaches the mill.

At one foot between centers of adjacent index marks at no reduction, then, for every ¼″ which the take-off magnets are moved away from the establishing magnets to maintain coincidence between the establishment and apprehension of index marks, the strip will have been subjected to 1% reduction of its cross-sectional area. In the assumed example of .010″ gauge strip, such ¼″ movement of the take-off magnets would be representative of the fact that the mill was imparting that reduction amounting to .0001" reduction in thickness. Such presetting of the take-off magnets may be accomplished by a reference point movable therewith in relation to a fixed gauge 36, similar to that shown and described in Figure 1.

It will be understood, therefore that many modifications of the invention may be made without departing from the scope thereof, and it is not intended that I be limited to the specific embodiment shown, other than as is rendered necessary by the recitations of the appended claims.

I claim:

1. An extensometer for combination with a mill for reducing and elongating metal bodies comprising a magnetizer for establishing local fields of magnetism in a metal body after reduction, a timer actuating said magnetizer at intervals determined by the rectilinear velocity of such a body before reduction, and magnetically responsive means under control of said timer and responsive to the local fields of magnetism in the body for determining the amount of extension imparted to said body.

2. An extensometer comprising a magnetizer for establishing local fields of magnetism in a metal body undergoing reduction, a magnetically responsive take-off device adapted to be excited by said local fields of magnetism, and a timer driven by the metal prior to its reduction, said timer being effective to synchronize the operations of said magnetizer and said device.

3. An extensometer for combination with a mill for reducing and elongating metal bodies comprising a magnetizer for establishing local fields of magnetism in a metal body after reduction, a timer actuating said magnetizer at intervals determined by the rectilinear velocity of such a body before reduction, magnetically responsive means under control of said timer and responsive to the local fields of magnetism in the body to control the mill so as to correct automatically off-gauge settings thereof, and to maintain the correct reducing condition.

4. An extensometer comprising a magnetizer for establishing local fields of magnetism in a metal body undergoing reduction, a magnetically responsive take-off device adapted to be excited by said local fields of magnetism, and a timer for rendering the magnetizer and take-off device operable synchronously.

5. An extensometer comprising a magnetizer for establishing local fields of magnetism in a metal body undergoing reduction, a magnetically responsive device movable with respect to said magnetizer adapted to be excited by said local fields of magnetism, means for effecting synchronous operation of said magnetizer and said device and measuring means actuable by the movement of said device.

6. An extensometer for combination with a mill for reducing and elongating metal bodies comprising a magnetizer disposed upon the exit side of the mill for placing magnetic marks in such a body, a timer disposed upon the entrance side of the mill adapted to be actuated by the entering body for operating said magnetizer, and means responsive to the magnetic marks in the body for determining the extension imparted thereto.

7. An extensometer for combination with a mill for reducing and elongating metal bodies comprising a magnetizer disposed upon the exit side of the mill for placing magnetic marks in such a body, a timer disposed upon the entrance side of the mill adapted to be actuated by the entering body for operating said magnetizer, means responsive to the magnetic marks to detect on-gauge, under-gauge, and over-gauge conditions, and means responsive to the last-named means for actuating the mill to preserve on-gauge conditions, and automatically to correct off-gauge conditions, whether over- or under-gauge, to establish the proper reducing condition.

8. The method of reducing metal stock which includes passing stock through a reducing zone, magnetically marking the stock upon the exit side of the zone, automatically measuring the distance between certain of said marks and controlling the reducing operation by said measurements in an automatic manner.

9. The method of reducing an elongated metal body which includes magnetizing spaced local fields on said body, measuring the amount of extension imparted thereto between adjacent magnetized fields during the reducing operation, and regulating the amount of reduction automatically in response to the said measuring operation.

10. The method of measuring elongated metal bodies during the reduction thereof which includes magnetically indexing the reduced body at a rate determined by the speed of advance of the unreduced body.

11. The method of reducing elongated metal bodies which includes measuring the amount of extension imparted thereto incident to the reducing operation by indexing a metal body after it has left the reducing means according to its rate of advance to said means, passing the indexing past mechanism responsive thereto, to measure the extent of reduction and to detect whether the reducing operation is reducing the body the desired amount, and automatically correcting the reducing condition in response to the measuring operation if more or less than the desired reduction is being imparted to said body.

12. Means for determining the amount of extension imparted to a metal body during the reduction thereof including an index establishing device, a plurality of detector mechanisms actuable in response to the indexing established by said device to detect under-gauge, on-gauge, and over-gauge conditions, and means operable in response to the movement of the body upon the approach side of the reducing operation for rendering said device and said mechanisms operative simultaneously.

13. Means for controlling the reduction of long metal bodies undergoing reduction by a reducing instrumentality comprising an index establishing device, a magnetic under-gauge detector mechanism, an over-gauge detector mechanism, means automatically responsive to the operation of said detector mechanisms for controlling the reducing instrumentality to diminish and increase the amount of reduction imparted to the body to restore desired gauge conditions, and means responsive to the magnetic indexing established by said device for terminating the operation of said last named means upon the attainment of desired gauge conditions.

PATRICK H. HUME.